DOMENICO CAMOSSO
BENITO LESCIO
INVENTORS

BY Young & Thompson
ATTORNEYS

United States Patent

[11] 3,628,838

[72] Inventors Domenico Camosso
Turin;
Benito Lescio, Rivoli, both of Italy
[21] Appl. No. 91,245
[22] Filed Nov. 20, 1970
[45] Patented Dec. 21, 1971
[73] Assignee RIV-SKF Officine di Villar Perosa S.p.A.
Turin, Italy

[54] ROLLING BEARING
12 Claims, 6 Drawing Figs.
[52] U.S. Cl............................................... 308/188,
308/187.2, 308/193, 308/216, 308/236
[51] Int. Cl...................................................... F16c 33/58,
F16c 33/76
[50] Field of Search............................................ 308/187.1,
187.2, 188, 190, 191, 192, 193, 196, 216, 236, 26;
29/148.4 R

[56] References Cited
UNITED STATES PATENTS
3,567,296  3/1971  Suchocki..................... 308/187.1
FOREIGN PATENTS
846,646  8/1952  Germany..................... 308/188

*Primary Examiner*—Martin P. Schwadron
*Assistant Examiner*—Barry Grossman
*Attorney*—Young & Thompson

ABSTRACT: A rolling bearing such as a ball bearing has inner and outer imperforate races each of which is W-shaped in cross section so as to provide a pair of grooves on whose confronting faces the balls roll. The balls completely fill the races, and rubber sealing rings may be positioned in the radially outwardly opening grooves of the outer race and/or the radially inwardly opening grooves of the inner race and/or between the races adjacent their edges.

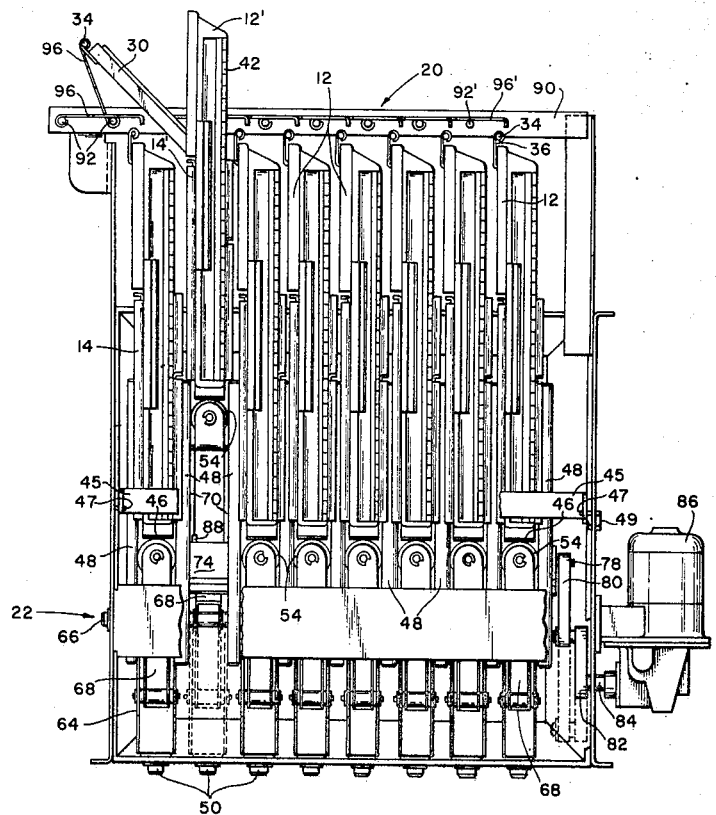

ROLLING BEARING

This invention relates to a ball bearing whose inner and outer races are made of sheet steel, and in particular to a bearing of this kind which enables to attain, during assembling, a correct bearing of said races both on the shaft and in the seat, and which is adapted to support high radial and axial loads in both directions with a low ratio of the axial to the radial play and arranged for being provided, in a rapid and easy manner, with rings of rubber or other material, in order to enable elastic mounting, axial anchorage, and a tight seal of said bearing.

Bearings with races of sheet steel are already known, wherein each race is obtained by plastic deformation of a semifinished product of suitable shape. These bearings, if they are of the kind adapted to support axial loads, besides the radial loads, have one or both races comprised of separate parts, which are united to one another in various manners; when the races comprise a single piece of sheet steel, then the resulting bearing is adapted to support, besides the radial loads, also axial loads in one direction only. Moreover, all the bearings with races of sheet steel have, in general, a limited capacity of radial and axial load, do not permit a very accurate mounting and, if intended for particular applications requiring additional rubber members, then appropriate machining of the races is necessary in order to enable assembling of such members. Finally, these bearings cannot be readily provided with lateral ring seals.

In accordance with the present invention, there is provided a ball bearing with races of sheet steel which enables to avoid the disadvantages enumerated above.

The ball bearing with races of sheet steel made according to the present invention is characterized in that the steel plate of each race, on both sides of the rolling groove for the balls, is deformed both radially on opposite sides with respect to the balls, so as to generate two annular space substantially V-shaped in cross section, adapted to receive rubber rings, and axially, so as to generate two flat cylindrical zones adjacent to each of said hollow spaces, whose outside diameter is substantially equal to the outside diameter of said groove and adapted to receive lateral ring seals.

The bearing in accordance with the present invention can be suitably manufactured by the process described in the copending U.S. Pat. application 91,244 of the same applicant, filed under even date herewith and titled "Method for the Manufacture of Rolling Bearings." For a better understanding of the present invention, one particular embodiment thereof will now be described, merely by way of nonlimiting example, with reference to the accompanying drawings, wherein.

Figure 1:
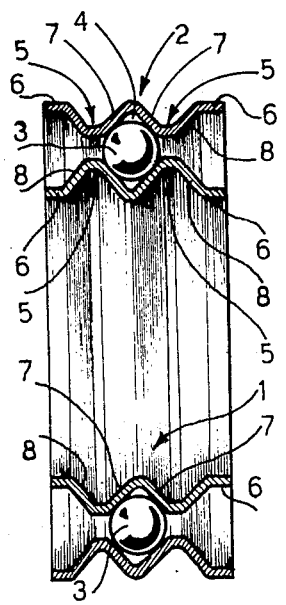
FIG. 1 shows a vertical section of the ball bearing according to the invention.
Figure 2:
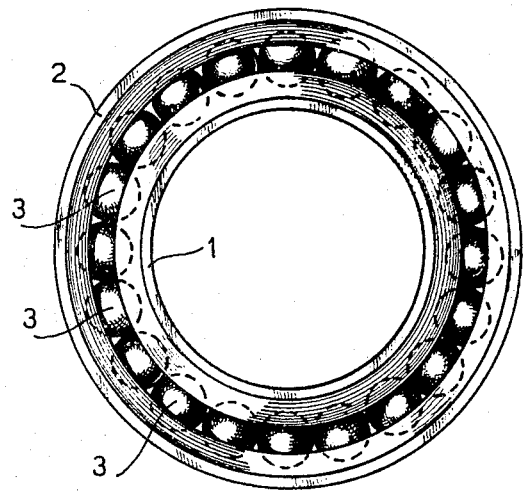
FIG. 2 is a side view of the bearing shown in FIG. 1.
Figure 3:
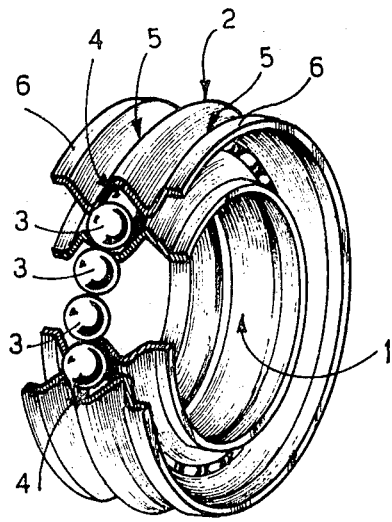
FIG. 3 is a perspective view of the bearing shown in FIG. 1.
Figure 6:
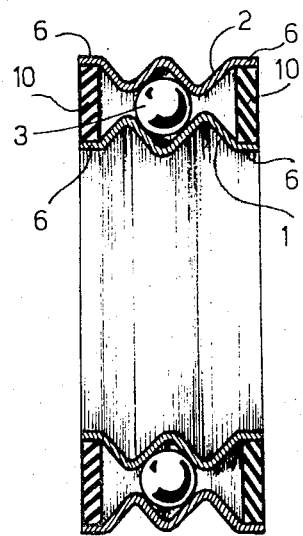

FIG. 6 is a vertical section of a bearing of the kind of that shown in FIG. 1, provided with lateral ring seals. With reference to FIGS. 1, 2, and 3, the bearing in accordance with the present invention comprises an inner race 1 and an outer race 2 of sheet steel, between which a crown of balls 3 is disposed. Each of the races 1 and 2 is W-shepd in cross section (FIG. 1) so as to form, on each race, a groove 4 constituting the rolling track for the balls, as well as two annular spaces 5 disposed symmetrically with respect to the groove 4 and two flat, ring-shaped end zones 6.

Each groove 4 is so shaped as to attain, with each ball 3, an abutment at two points which are symmetrical relative to a plane at right angles to the axis of the bearing passing through the center of the balls. Preferably, the groove 4 is defined by two portions or sections 7 forming a certain angle with the axis of the bearing and merging with one another. Each annular space 5 is also defined by said portions 7 and by another pair of sections 8, which merge with the first-mentioned sections as well as with the ring-shaped end zones 6.

Suitably, the bearing in accordance with the present invention can be manufactured with the process described in the patent application of the same applicant mentioned above. According to this process, the bearing is obtained starting from a pair of tubular members originating the inner race 1 and the outer race 2 in the finished bearing; between these tubular members the balls 3 are disposed in the initial stage of W-shaped process. By exerting—for instance, by means of two rollers whose profile corresponds to the final profile of the races 1 and 2—adequate radial pressures upon said annular members, directed towards the balls 3, it is possible to obtain, by rolling, the bearing shown in FIG. 1. During processing, the balls 3 are supported by suitable means, preferably by lateral rings, which permit revolution of said balls substantially about parallel axes, which are also parallel to the axis of the bearing and passing through the center of the balls 3. Therefore, the inner tubular member, which is entrained in rotation by one of said rollers, will cause the balls 3 to rotate, and the latter will entrain in rotation the outer tubular member.

The bearing according to the present invention, shown in FIGS. 1, 2, and 3, has a high capacity of load, both radial and axial, inasmuch as the number of the balls 3 can be very high, either if a spacer cage or retainer is provided or not, and because, as stated above, each ball is in contact with two points on each race, on the sections 7 of the grooves 4.

Further, assembling of the bearing on the shaft and inside the corresponding seat is highly accurate, because each race 1 and 2 will abut in correspondence with three annular zones, i.e., a central zone (in correspondence with the merging area of the two sections 7 of the groove 4), and two lateral or side areas (in correspondence with the ring-shaped end zones 6), respectively.

Figure 4:
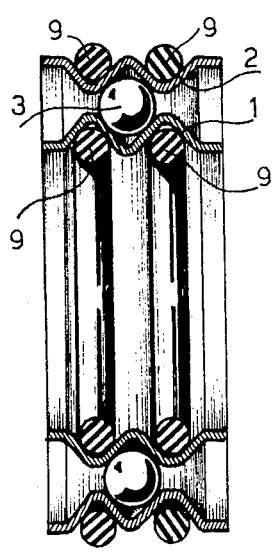
FIG. 4 shows a vertical section of a bearing of the kind of that illustrated in FIG. 1, on whose inner and outer race rubber members or rings have been mounted.
Figure 5:
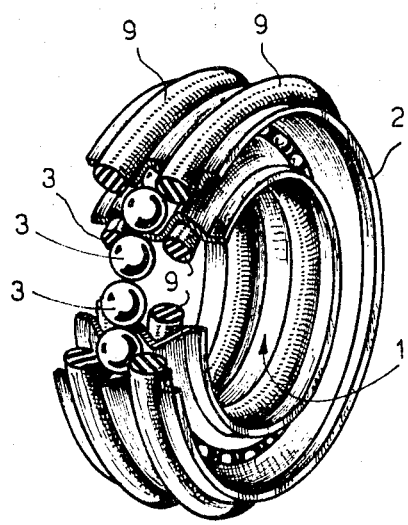
FIG. 5 is a perspective view of the bearing shown in FIG. 4.

In addition, the bearing according to the present invention is adapted to be utilized, in a rapid and easy manner, for particular applications, for instance when it should be mounted with the intermediary of rings or members made of rubber or other material. As is well known, this kind of as assembling enables a fairly good adaptability of the bearing with respect to the shaft and the seat, as well as a good electrical insulation between the shaft and the seat. To this end, it will be simply necessary to mount rubber members or rings 9 on the bearing, as shown in FIGS. 4 and 5. The annular hollow spaces 5, already present on each race 1 and 2, permit an easy and rapid assembling of any kind of ring.

Finally, it will be possible to provide the bearing of the invention with lateral ring seals 10, as shown in FIG. 6. In fact, the flat, ring-shaped end zones 6, besides defining two cylindrical side zones of reduced width (which permit, as already stated, to mount the bearing on the shaft and in the corresponding seat in a highly accurate manner) have the function of stably holding the lateral ring seals 10 in position. The constructional arrangement illustrated in FIG. 6 is suitable when it is desired to prevent foreign matter from entering the space comprised between the two races in which the balls 3 revolve, or to prevent the lubricant from coming out from said space.

It will be apparent that many modifications and variations can be introduced in the embodiment of the present invention described above, concerning both the shape and the arrangement of the various parts and components, without departing from the scope of the invention.

Having described our invention, we claim:

1. A rolling bearing having inner and outer races of sheet steel, the outer race having a pair of axially spaced radially outwardly opening grooves therein and the inner race having a pair of axially spaced radially inwardly opening grooves therein, and a plurality of rolling bearing elements disposed between said races and between said grooves of each race.

2. A bearing as claimed in claim 1, each said element being in contact with said groove at spaced points on said element.

3. A bearing as claimed in claim 1, each said race having a W-shaped cross section.

4. A bearing as claimed in claim 1, each said groove being V-shaped in cross section.

5. A bearing as claimed in claim 1, the opposite edges of said races being cylindrical.

6. A bearing as claimed in claim 1, and annular elastic deformable sealing means disposed in said radially inwardly opening grooves of said inner race.

7. A bearing as claimed in claim 1, and annular elastic deformable sealing means disposed in said radially outwardly opening grooves of said outer race.

8. A bearing as claimed in claim 1, and annular elastic deformable sealing means disposed in said radially inwardly opening grooves of said inner race and in said radially outwardly opening grooves of said outer race.

9. A bearing as claimed in claim 1, and annular elastic deformable sealing means disposed between the edges of said inner and outer races.

10. A bearing as claimed in claim 9, said edges being cylindrical.

11. A bearing as claimed in claim 1, said element being balls.

12. A bearing as claimed in claim 1, said elements being in contact with each other substantially entirely about the bearing.

* * * * *